United States Patent [19]

Costello

[11] 4,455,240
[45] Jun. 19, 1984

[54] AMPHOLYTIC POLYMERS FOR USE AS FILTRATION CONTROL AIDS IN DRILLING MUDS

[75] Inventor: Christine A. Costello, Coraopolis, Pa.

[73] Assignee: Calgon Corporation, Pittsburgh, Pa.

[21] Appl. No.: 331,101

[22] Filed: Dec. 15, 1981

[51] Int. Cl.³ .............................................. C09K 7/02
[52] U.S. Cl. ............................ 252/8.5 C; 252/8.5 P
[58] Field of Search ............. 252/8.5 C, 8.5 A, 8.5 P; 526/292.2, 292.95

[56] References Cited

U.S. PATENT DOCUMENTS

| | | | |
|---|---|---|---|
| 2,552,775 | 5/1951 | Fischer et al. | 252/8.5 |
| 2,650,905 | 9/1953 | Fordyee et al. | 252/8.5 |
| 2,655,475 | 10/1953 | Fischer et al. | 252/8.5 |
| 2,718,497 | 9/1955 | Oldham et al. | 252/8.5 |
| 2,775,557 | 12/1956 | Morgan | 252/8.5 |
| 2,911,365 | 11/1959 | Burland et al. | 252/8.5 |
| 2,911,366 | 11/1959 | Hedrick et al. | 252/8.5 |
| 2,960,464 | 11/1960 | Weiss et al. | 252/8.5 |
| 3,025,234 | 3/1962 | Canterino | 252/8.5 |
| 3,072,569 | 1/1963 | Slegele | 252/8.5 |
| 3,157,599 | 11/1964 | Gloor | 252/8.5 |
| 3,215,628 | 11/1965 | Peacock | 252/8.5 |
| 3,232,870 | 2/1966 | Cowan et al. | 252/8.5 |
| 3,624,019 | 11/1978 | Anderson et al. | 252/8.5 |
| 3,639,208 | 2/1972 | Varveri et al. | 162/168 |
| 4,077,930 | 3/1978 | Lim et al. | 260/29.6 |
| 4,171,417 | 10/1979 | Dixon | 526/245 |
| 4,366,071 | 12/1982 | McLaughlin et al. | 252/8.55 |

FOREIGN PATENT DOCUMENTS 2044321 3/1980 United Kingdom .

*Primary Examiner*—Herbert B. Guynn
*Attorney, Agent, or Firm*—Michael C. Sudol, Jr.; R. Brent Olson

[57] ABSTRACT

The instant invention is directed to an aqueous drilling fluid comprising an aqueous clay dispersion and a carboxylic functional polyampholyte, or the salt thereof. The instant invention is also directed to the use of the drilling fluid.

14 Claims, No Drawings

AMPHOLYTIC POLYMERS FOR USE AS FILTRATION CONTROL AIDS IN DRILLING MUDS

BACKGROUND OF THE INVENTION

It is well known that in perforating earthen formations to tap subterranean deposits such as gas or oil, that perforation is accomplished by well drilling tools and a drilling fluid. The drilling fluid serves to cool and lubricate the drill bits, to carry the cuttings to the surface as the drilling fluid is circulated in and out of the well, to support at least part of the weight of the drill pipe and drill bit, to provide a hydrostatic pressure head to prevent caving of the walls of the well bore, to deposit on the surface of the well bore a filter cake which acts as a thin, semi-impervious layer to prevent undue passage therethrough of fluids, and to perform other functions as are well known in the drilling art. It is important that the drilling fluid exhibit a relatively low rate of filtration or fluid loss in addition to having desirable rheological properties such as viscosity and gel strength. It is also important that the drilling fluid system should be kept as simple and inexpensive as possible in order to avoid undue expense in the drilling of the well.

Drilling fluid also has an effect on the friction between the drill pipe and the bore hole, and the higher the coefficient of friction between the drill pipe and the formation being drilled, that is, the lower the degree of lubricity of the drilling fluid, the greater the power requirements needed to rotate the drill pipe in the bore hole filled with the drilling fluid. Further in this respect, a drilling fluid having a low degree of lubricity or a high coefficient of friction between the drill pipe and the uncased well bore means that a high degree of drag on the drill pipe results, thereby lessening the useful life of the drill pipe. Therefore, the lubricating properties of the drilling fluid are assuming an increased importance to those skilled in the art, not only with regard to the wearing of the bearings in the drill bit, but also with respect to the friction between the drill pipe and the uncased bore hole.

Drilling an oil or gas well is generally conducted by a rotary system. This system depends upon the rotation of a string of drill pipe to the bottom of which is attached a multi-pronged drilling bit. The bit cuts into the earth causing the cuttings to accumulate as drilling continues. As a result, a drilling fluid must be used to carry these cuttings to the surface for removal, thus allowing the bit to continue functioning and the bottom hole to be kept clean and free of cuttings at all times. Drilling systems other than the rotary system are sometimes used, but these also require a drilling fluid to remove the bore hole cuttings and to perform functions related to drilling fluids.

Oil-producing formations are generally porous layers having varying degrees of permeability to the flow of fluids such as oil, water or gas. Consequently, the rate of oil production is largely determined by the rate of flow through these permeable formations which, in turn, is dependent upon the porosity or permeability of the sand or stone present. In drilling through such a porous layer, it is desirable to employ a drilling fluid having such characteristics that excessive amounts of liquids or solids are prevented from penetrating through the porous formation. The ability of the drilling fluid to prevent excessive formation fluid penetration is called filtration control.

Materials that have been used in the past to control filtration rates of aqueous drilling fluids by plugging, producing cakes or similar methods, have included materials such as pregelatinized starch, sodium carboxylmethylcellulose, sodium polyacrylates and lignites. Each of these materials have certain limitations. For example, lignite becomes ineffective in high salt concentrations.

Acrylic and methacrylic derivatives, such as those which are copolymerized with hydrocarbon substituted styrenes, such as alpha methyl styrene, para methyl styrene, 2,4-dimethyl styrene and the like have been utilized in drilling fluids. For example, U.S. Pat. No. 2,718,497 teaches the use of relatively high molecular weight polymers of these materials to control water loss characteristics of aqueous muds and clay dispersions. Additionally, U.S. Pat. No. 2,650,905 teaches the use of water soluble sulfonated polystyrene derivatives for filtration control in water-based drilling fluids.

Acrylic acid derivatives such as copolymers of acrylamide and sodium acrylate derivatives have been frequently used commercially as flocculants for drilling fluids, and are disclosed in U.S. Pat. Nos. 3,558,545 and 3,472,325. Similarly, a copolymer derived from acrylic acid and acrylamide is disclosed in U.S. Pat. No. 3,323,603 as a flocculant for aqueous drilling fluids.

Published British Application No. 2,044,321A discloses a copolymer additive prepared from (1) a meth(acrylamido alkyl sulfonic acid) or alkali metal salt thereof and (2) a (meth)acrylamide or N-alkyl (meth)-acrylamide. The copolymer may be cross-linked with a quaternary ammonium salt.

DESCRIPTION OF THE INVENTION

The instant invention is directed to an aqueous drilling fluid comprising:
  (a) an aqueous clay dispersion; and
  (b) a carboxylic functional polyampholyte, or the salt thereof.

The instant invention is also directed to a method for drilling a well in a subterranean formation comprising circulating into the well, during drilling an aqueous drilling fluid, the improvement wherein said aqueous drilling fluid comprises:
  (a) an aqueous clay dispersion; and
  (b) a carboxylic functional polyampholyte, or the salt thereof.

The clay dispersion may be any finely divided solid which is capable of being dispersed or suspended in an aqueous liquid vehicle. Ordinarily, such material will include hydratable clay or colloidal clay bodies such as Wyoming bentonite, commercial medium-yield drilling clays mined in various parts of the country such as in Texas, Tennessee and Louisiana, and those produced when clayey subsurface formations are drilled. Weighting materials added to increase specific gravity such as barites, iron oxide, and the like may also be included.

The aqueous medium may be fresh water such as is obtained from wells or streams; it may be salt water from the sea or from wells; or, it may even include oil-in-water emulsions, i.e., water which has become contaminated in some way with small quantities of oil, or to which such oil has been added to gain some desired advantage.

It is contemplated that the drilling muds of the invention may also contain other additives besides the polymers of the invention. Materials such as caustic, quebracho, lime and the like may be added to the drilling mud at the surface while other materials such as gypsum, shale and the like may be encountered in subsurface formations during drilling operations.

When employed in accordance with the invention, the polymer may be added directly to the drilling mud as a dry powder, as a slurry suspended in a suitable liquid, or as a solution in water or some other suitable solvent, and they may be incorporated therein at any convenient point in the mud circulation system. It may be desirable to employ a mixing device such as a cone and jet mixer or the equivalent for incorporating the additive in the mud.

Any carboxylic functional polyampholyte, or the salt thereof, may be used. A polyampholyte is a polymer containing anionic, cationic and optionally nonionic mer units. The anionic mer unit contains the carboxyl grou. It is preferred (although not required) that at least 10 mole percent or in terms of weight percent, at least 5%, by weight, of the polyampholyte be made up of anionic mer units.

Although any carboxylic functional polyampholyte may be used, it is preferably prepared from:

(i) at least one carboxylic functional monomer of the formula:

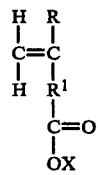

wherein

R is hydrogen, a phenyl or an alkyl group of from 1 to 3 carbon atoms, preferably hydrogen, methyl or ethyl, $R^2$ is a straight or branched chain of from 0 to 12 carbon atoms, preferably 0 to 3, and X is hydrogen or an alkali or alkaline earth metal, preferably hydrogen, sodium, potassium or cesium;

(ii) at least one cationic-containing monomer; and (iii) optionally, non-ionic monomer.

Any carboxylic functional monomer, or its salt, may be used. Examples include acrylic acid, methacrylic acid, vinyl acetic acid, allylacetic acid, 4-methyl-4-pentenoic acid. The preferred carboxylic functional monomers are acrylic acid and methacrylic acid. Mixtures of carboxylic functional monomers may be used in preparing the polyampholyte.

Any cationic-containing monomer may be used. The preferred cationic-containing monomers are:

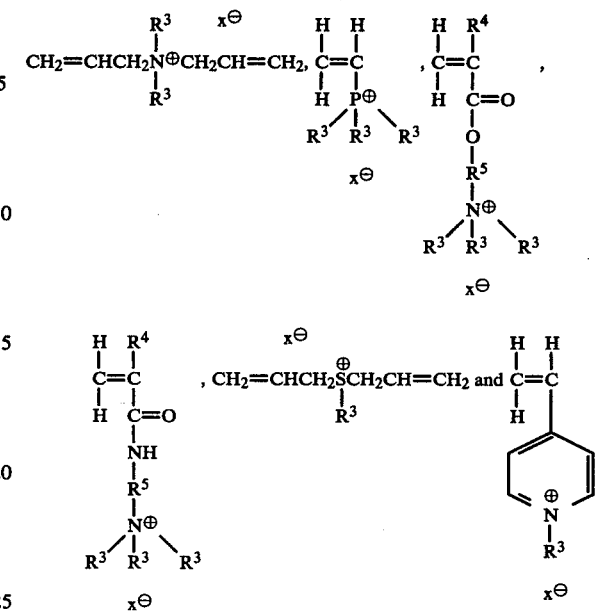

wherein $R^3$ is hydrogen, a phenyl, or an alkyl group of from 1 to 3 carbon atoms;

$R^4$ is a hydrogen or an alkyl group of from 1 to 3 carbon atoms, preferably a hydrogen or methyl group, $R^5$ is a straight or branched chain of from 1 to 12 carbon atoms, preferably 1 to 3 carbon atoms; and X is an anion, preferably a halogen or alkyl sulfate.

X may be any anion in the above formula. Examples include halogen, sulfate, sulfonate, phosphate, hydroxide, borate, cyanide, carbonate, thiocyanate, thiosulfate, isocyanate, sulfite, bisulfite, nitrate, nitrite, oxalate, silicate, sulfide, cyanate, acetate and the other common inorganic and organic ions.

Specific examples of the most preferred cationic-containing monomers include diethyldiallyl ammonium chloride, dimethyldiallyl ammonium chloride, methacryloyloxy ethyl trimethyl ammonium methylsulfate and methacrylamido propyl trimethyl ammonium chloride. Mixtures of cationic-containing monomers may be used in preparing the polyampholyte.

The polyampholyte may also be prepared by polymerizing a monomer containing a tertiary amine as the pendant group with subsequent quaternization of the nitrogen in the polymer to form the cationic mer units. Likewise, sulfur and phosphorus-containing monomers may be exhaustively methylated to form cations.

Any non-ionic monomer may optionally be used. Examples include: acrylamide, and its derivatives, such as methacrylamide, and N,N-dimethyl acrylamide; acrylonitrile; vinyl acetate; vinyl pyridine; methacrylate, and its derivatives; maleic anhydride; styrene, and its derivatives; ethylene; and alkylene oxides. The preferred non-ionic monomer is acrylamide. Mixtures of non-ionic monomers may be used in preparing the polyampholyte.

The most preferred carboxylic functional polyampholytes are terpolymers prepared from:

(i) a carboxylic functional monomer of the formula:

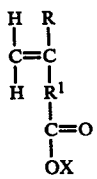

wherein
R is hydrogen, a phenyl or an alkyl group of from 1 to 3 carbon atoms, preferably a hydrogen, methyl or ethyl,
$R^1$ is a branched or straight chain of from 0 to 12 carbon atoms, preferably 0 to 3, and
X is hydrogen or an alkali or an alkaline earth metal, preferably hydrogen, sodium, potassium or cesium;

(ii) a monomer of the formula:

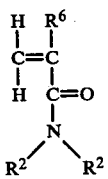

wherein
$R^6$ is hydrogen, a phenyl or an alkyl group of from 1 to 3 carbon atoms, preferably a hydrogen, methyl, or ethyl, and
$R^2$, which may be the same or different, is a hydrogen, or an alkyl group of from 1 to 3 carbon atoms; and (iii) a cationic-containing monomer containing an ion selected from the group consisting of a quaternary ammonium, phosphonium or sulfonium.

The polymer may be produced from any ratio of the monomers. It is preferred that the polymer be prepared from 5 to 90%, most preferably 32.5 to 85%, by weight, carboxylic functional monomer; 0.5 to 85%, most preferably 1.5 to 40%, by weight, cationic monomer; and 0 to 85%, more preferably 1.5 to 85%, and most preferably 5 to 65%, by weight, non-ionic monomer. A higher percent of non-ionic monomer may be used, and subsequently hydrolyzed to a sufficient extent that the final percent is in the preferred range.

The quantity of the polymer to be employed in the drilling mud of the invention will vary with circumstances over a reasonably wide range and the amount employed in a specific suspension or dispersion will depend on these circumstances and the characteristics of the drilling fluid treated. Ordinarily, satisfactory results with regard to water loss reduction will be obtained with quantities ranging between one and four pounds per 42-gallon barrel of drilling mud. For optimum reduction in filtration rate with certain drilling muds, however, quantities up to 6 pounds per 42-gallon barrel may be required. On the other hand, in some cases where, for example, only small improvement in filtration rate is desired, as little as 0.125 pound of the additive per barrel of mud will produce the desired effect. The exact amount to be added, as previously pointed out, depends upon the original character of the mud and on the properties desired. This can be determined, as is customary in the field by simple tests at the time the addition is made.

The carboxylic functional polyampholyte may be prepared by mixing the monomers preferably in the presence of a free radical initiator. Any free radical initiator may be used. Examples include peroxides, azo initiators and redox systems. The polymerization may also be initiated photochemically. The preferred catalysts are sodium persulfate or a mixture of ammoniumpersulfate and any azo type initiator, such as 2,2'-azobis-(2,4-dimethyl-4-methoxyvaleronitrile).

The polyampholyte may be made by any of a variety of procedures, for example, in solution, suspension, bulk and emulsions.

The temperature is not critical. The reaction will generally occur between 10° and 100° C., preferably 40° to 60° C. It is generally impractical to run the reaction below room temperature because the reaction is too slow. Above a temperature of 60° C., the molecular weight of the polymer tends to decrease. The reaction, depending on the temperature, generally takes from 1 to 12 hours. Measuring for residual monomer will verify when the reaction is complete.

The pH of the reaction mixture is not critical. The pH is generally in the range of 4.5 to 9.0.

The percent solids in the reaction mixture is not critical. The preferred range is 1 to 50%, by weight, solids.

The molecular weight of ampholytic polymers is difficult to accurately measure. The polymers are, instead, usually identified by intrinsic viscosity. The intrinsic viscosity of the polyampholyte is not critical in the instant invention. The preferred intrinsic viscosity is 0.5 to 4.5 dl/g.

EXAMPLES 1-16

The polymers of the Examples were produced by mixing the cationic, anionic and optionally nonionic monomers indicated in Table I, in the amounts, solids concentration, initial temperatures, and pH indicated. The monomer mix was purged with nitrogen for one hour. The solvent was deionized water. The initiator was added and the components allowed to react for about three hours.

The resulting polymer was added to an aqueous clay dispersion and the viscosity and fluid loss measured. Ten grams of Betonite clay were added to 200 cc of deionized water and sheared for 15 minutes. Then 105 g of a $$\frac{180 \text{ g KCl}}{1000 \text{ g total}}$$

solution were added to the slurry and sheared for 5 minutes. For the sea water evaluation 15 g of Bentonite clay were added to 200 cc of deionized water and sheared for 15 minutes. Then 105 g of a $$\frac{175 \text{ g sea salt}}{1000 \text{ g total}}$$

solution were added to the slurry and sheared for 5 minutes. The sea salt used was Instant Ocean ®, a product manufactured by Aquarium Systems. To both mixtures, 2 g of active polymer dissolved in 50 g total solution (pH adjusted to 8.5 with NaOH) were added with continued shearing for 15 minutes. The viscosity of this slurry was measured on a FANN viscometer (Model 35) at 600 rpm and 300 rpm. The 30-minute fluid loss (FL), in mls, was measured on a FANN (Model 12) BC filter press under 100 psi of nitrogen.

TABLE I

| Exam. | Cationic Monomer | Wt % | Anionic Monomer | Wt % | Non-Ionic Monomer | Wt % | Initiator (Moles initiator/moles monomer) | Reaction Condition Solids | pH | Temp. | Performance (KCl) 600 | 300 | FL | Performance (Sea Salt) 600 | 300 | FL | [n] |
|---|---|---|---|---|---|---|---|---|---|---|---|---|---|---|---|---|---|
| 1. | — | — | — | — | — | — | — | — | — | — | 29 | 28 | 131.0 | 20 | 16 | 60 | — |
| 2. | DMDAAC[1] | 20 | Acrylic Acid | 70 | N,N—Dimethylacrylamide | 10 | $3 \times 10^{-3}$ APS[4] / $0.5 \times 10^{-3}$ ADM[5] | 10 | 7.0 | 60°C | 23 | 13 | 9.5 | — | — | — | — |
| 3. | DMDAAC[1] | 20 | Acrylic Acid | 70 | Methacrylamide | 10 | $3 \times 10^{-3}$ APS[4] / $0.5 \times 10^{-3}$ ADM[5] | 10 | 7.0 | 60°C | 12 | 6.5 | 31.5 | — | — | — | — |
| 4. | DMDAAC[1] | 10 | Methacrylic Acid | 70 | Acrylamide | 20 | $3 \times 10^{-3}$ APS[4] / $0.5 \times 10^{-3}$ ADM[5] | 10 | 7.0 | 60°C | 22 | 17 | 60.0 | — | — | — | — |
| 5. | Vinyl-Triphenyl Phosphonium Bromide | 10 | Acrylic Acid | 70 | Acrylamide | 20 | $3 \times 10^{-3}$ APS[4] / $0.5 \times 10^{-3}$ ADM[5] | 10 | 7.0 | 60°C | 7 | 4 | 15.0 | — | — | — | 1.1 |
| 6. | MAPTAC[2] | 20 | Acrylic Acid | 70 | Acrylamide | 10 | $3 \times 10^{-3}$ APS[4] / $0.5 \times 10^{-3}$ ADM[5] | 10 | 7.0 | 60°C | 10 | 5 | 18.9 | — | — | — | 2.25 |
| 7. | MAPTAC[2] | 40 | Acrylic Acid | 40 | Acrylamide | 20 | $3 \times 10^{-3}$ APS[4] / $0.5 \times 10^{-3}$ ADM[5] | 10 | 7.0 | 60°C | 22 | 15 | 10.5 | — | — | — | — |
| 8. | DMDAAC[1] | 30 | Acrylic Acid | 70 | — | — | $3 \times 10^{-3}$ SPS[6] | 15 | 7.0 | 50°C | 13 | 6 | 10.5 | — | — | — | — |
| 9. | DMDAAC[1] | 20 | Acrylic Acid | 70 | Vinyl Acetate | 10 | $3 \times 10^{-3}$ SPS[6] | 10 | 7.0 | 50°C | 14 | 8 | 48.0 | — | — | — | — |
| 10. | DMDAAC[1] | 10 | Acrylic Acid | 70 | Styrene[3] | 20 | $3 \times 10^{-3}$ SPS[6] | 20 | 4.5 | 50°C | 66 | 52 | 82 | — | — | — | — |
| 11. | DMDAAC[1] | 1.5 | Acrylic Acid | 48.2 | Acrylamide | 50.3 | $3 \times 10^{-3}$ SPS[6] | 30 | 4.5 | 50°C | 13 | 7 | 11.5 | 10 | 5 | 8 | 1.8 |
| 12. | DMDAAC[1] | 17.5 | Acrylic Acid | 32.5 | Acrylamide | 50 | $3 \times 10^{-3}$ SPS[6] | 30 | 4.5 | 50°C | 13 | 6 | 13.8 | 14 | 7 | 27 | 1.0 |
| 13. | DMDAAC[1] | 5 | Acrylic Acid | 85 | Acrylamide | 10 | $3 \times 10^{-3}$ SPS[6] | 30 | 4.5 | 50°C | 8 | 5 | 25 | 13 | 10 | 42 | 0.82 |
| 14. | DMDAAC[1] | 25 | Acrylic Acid | 70 | Acrylamide | 5 | $3 \times 10^{-3}$ SPS[6] | 30 | 4.5 | 50°C | 16 | 9 | 7.9 | 40 | 34 | 84 | 4.3 |
| 15. | DMDAAC[1] | 2.5 | Acrylic Acid | 32.5 | Acrylamide | 65 | $3 \times 10^{-3}$ SPS[6] | 30 | 4.5 | 50°C | 8 | 4 | 17.0 | 15 | 7 | 12 | 1.3 |
| 16. | METAMS[7] | 10 | Acrylic Acid | 70 | Acrylamide | 20 | $2 \times 10^{-3}$ [M] APS[4] | 10 | 7.0 | 40°C | 15 | 9 | 25.9 | — | — | — | — |

[1] DMDAAC = dimethyldiallyl ammonium chloride
[2] MAPTAC = methacrylamido propyl trimethyl ammonium chloride
[3] a 50/50 dimethylformamide/water solvent was used
[4] APS = ammonium persulfate
[5] ADM = 2,2′ azobis(2,4′dimethyl/4′methoxyvaleronitrile)
[6] SPS = sodium persulfate
[7] METAMS = methacryloyloxyethyl trimethyl ammonium methylsulfate

EXAMPLE 17

A 90/10 acrylamide/dimethyldiallyl ammonium chloride copolymer was prepared as indicated in Examples 1–16. The copolymer was then hydrolyzed by adding a stoichiometric amount of sodium hydroxide to achieve a 70/20/10 terpolymer of acrylic acid/acrylamide/dimethyldiallyl ammonium chloride. The resulting polymer was added to an aqueous clay dispersion and the viscosity and fluid loss were measured as in Examples 1–16. The viscosity (KCL test) at 600 rpm was 10 and at 300 rpm was 5. The fluid loss for 30 minutes was 11.0 ml.

I claim:

1. An aqueous drilling fluid comprising:
   (a) an aqueous clay dispersion; and
   (b) a water loss reducing amount of a carboxylic functional polyampholyte, or the salt thereof, having an intrinsic viscosity of at least 0.5 dl/g, prepared from:
   (i) at least one carboxylic functional monomer; of the formula:

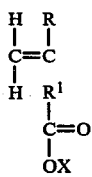

wherein
   R is hydrogen, a phenyl group or an alkyl group of from 1 to 3 carbon atoms,
   $R^1$ is a branched or straight chain of from 0 to 12 carbon atoms, and
   X is hydrogen or an alkali or alkaline earth metal
   (ii) at least one cationic-containing monomer containing an ion selected from the group consisting of a quaternary ammonium, phosphonium or sulfonium having one of the following structures:

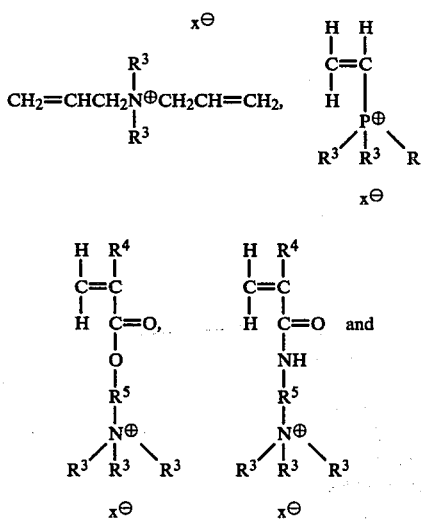

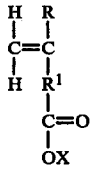

wherein
   $R^3$ is a phenyl or an alkyl group of from 1 to 3 carbon atoms,
   $R^4$ is a hydrogen or an alkyl group of from 1 to 3 carbon atoms,
   $R^5$ is a straight or branched chain of from 1 to 12 carbon atoms, and
   X is an anion; and
   (iii) optionally, non-ionic monomer.

2. The aqueous drilling fluid of claim 1, wherein said polyampholyte is prepared from
   (i) 5 to 90%, by weight, of said carboxylic functional monomer;
   (ii) 0.5 to 85%, by weight, of said cationic-containing monomer; and
   (iii) 0 to 85%, by weight, of said non-ionic monomer.

3. The aqueous drilling fluid of claim 2, wherein said polyampholyte is prepared from:
   (i) 32.5 to 85%, by weight, of said carboxylic functional monomer;
   (ii) 1.5 to 40%, by weight, of said cationic-containing monomer; and
   (iii) 5 to 65%, by weight, of said non-ionic monomer.

4. The aqueous drilling fluid of claim 1, wherein said carboxylic functional monomer is acrylic acid; said non-ionic monomer is selected from the group consisting of acrylamide, methacrylamide and N,N-dimethylacrylamide; and said cationic-containing monomer is selected from the group consisting of diethyldiallyl ammonium chloride, dimethyldiallyl ammonium chloride, methacryloyloxy ethyl trimethyl ammonium methylsulfate and methacrylamido propyl trimethyl ammonium chloride.

5. The aqueous drilling fluid of claim 1, wherein said carboxylic functional polyampholyte is a terpolymer prepared from:
   (i) a carboxylic functional monomer of the formula:

$$\begin{array}{c} H \quad R \\ | \quad | \\ C=C \\ | \quad | \\ H \quad R^1 \\ \quad | \\ \quad C=O \\ \quad | \\ \quad OX \end{array}$$

wherein
   R is hydrogen, a phenyl or an alkyl group of from 1 to 3 carbon atoms,
   $R^1$ is a branched or straight chain of from 0 to 12 carbon atoms, and
   X is hydrogen or an alkali or alkaline earth metal;
   (ii) a monomer of the formula:

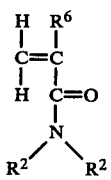

wherein

R⁶ is hydrogen, a phenyl or an alkyl group of from 1 to 3 carbon atoms, and

R², which may be the same or different, is a hydrogen, or an alkyl group of from 1 to 3 carbon atoms; and (iii) a cationic-containing monomer containing an anion selected from the group consisting of a quaternary ammonium, phosphonium or sulfonium having one of the following structures:

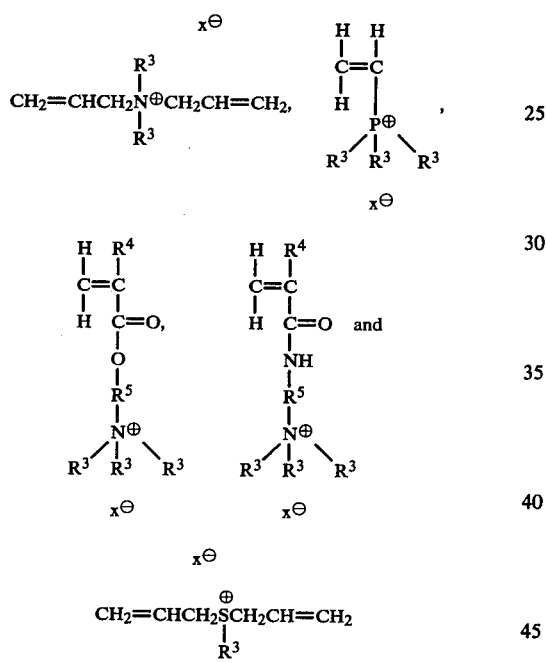

wherein

R³ is a phenyl or an alkyl group of from 1 to 3 carbon atoms,

R⁴ is a hydrogen or an alkyl group of from 1 to 3 carbon atoms,

R⁵ is a straight or branched chain of from 1 to 12 carbon atoms, and

X is an anion.

6. The aqueous drilling fluid of claim 1, wherein at least 0.125 pound of polyampholyte is used per barrel of aqueous clay dispersions.

7. The aqueous drilling fluid of claim 1, wherein said polyampholyte has an intrinsic viscosity of 0.5 to 4.5 dl/g.

8. A method of drilling a well in a subterranean formation comprising circulating into the well, during drilling, an aqueous drilling fluid, the improvement wherein said aqueous drilling fluid comprises:

(a) an aqueous clay dispersion; and (b) a water loss reducing amount of a carboxylic functional polyampholyte, or its salt, having an intrinsic viscosity of at least 0.5 dl/g, prepared from:

(i) at least one carboxylic functional monomer of the formula:

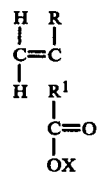

wherein

R is hydrogen, a phenyl group or an alkyl group of from 1 to 3 carbon atoms,

R¹ is a branched or straight chain of from 0 to 12 carbon atoms, and

X is hydrogen or an alkali or alkaline earth metal (ii) at least one cationic-containing monomer containing an ion selected from the group consisting of a quaternary ammonium, phosphonium or sulfonium having one of the following structures:

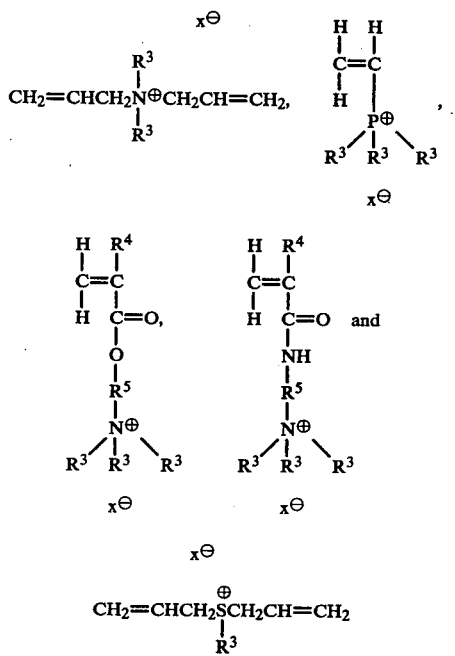

wherein

R³ is a phenyl or an alkyl group of from 1 to 3 carbon atoms,

R⁴ is a hydrogen or an alkyl group of from 1 to 3 carbon atoms,

R⁵ is a straight or branched chain of from 1 to 12 carbon atoms, and

X is an anion; and (iii) optionally, non-ionic monomer.

9. The method of claim 8, wherein said polyampholyte is prepared from:

(i) 5 to 90%, by weight, of said carboxylic functional monomer;

(ii) 0.5 to 85%, by weight, of said cationic-containing monomer; and (iii) 0 to 85%, by weight, of said non-ionic monomer.

10. The method of claim 8, wherein said polyampholyte is prepared from:
(i) 32.5 to 85%, by weight, of said carboxylic functional monomer;
(ii) 1.5 to 40%, by weight, of said cationic-containing monomer; and
(iii) 5 to 65%, by weight, of said non-ionic monomer.

11. The method of claim 8, wherein said carboxylic functional monomer is acrylic acid; said non-ionic, monomer is selected from the group consisting of acrylamide, methacrylamide and N,N-dimethyl acrylamide; and said cationic-containing monomer is selected from the group consisting of diethyldiallyl ammonium chloride, dimethyldiallyl ammonium chloride, methacryloyloxy ethyl trimethyl ammonium methylsulfate and methacrylamido propyl timethyl ammonium chloride.

12. The method of claim 8, wherein said carboxylic functional polyampholyte is a terpolymer prepared from:
(i) a carboxylic functional monomer of the formula:

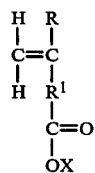

wherein
R is hydrogen, a phenyl or an alkyl group of from 1 to 3 carbon atoms,
$R^1$ is a branched or straight chain of from 0 to 12 carbon atoms, and
X is hydrogen or an alkali or alkaline earth metal;
(ii) a monomer of the formula:

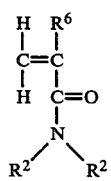

wherein $R^6$ is hydrogen, a phenyl or an alkyl group of from 1 to 3 carbon atoms, and
$R^2$, which may be the same or different, is a hydrogen, or an alkyl group of from 1 to 3 carbon atoms; and
(iii) a cationic-containing monomer containing an ion selected from the group consisting of a quaternary ammonium, phosphonium or sulfonium having one of the following structures:

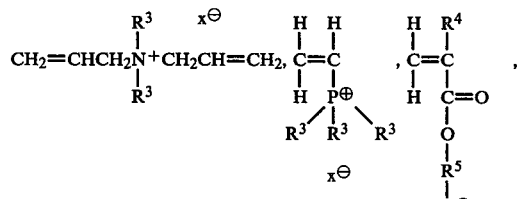

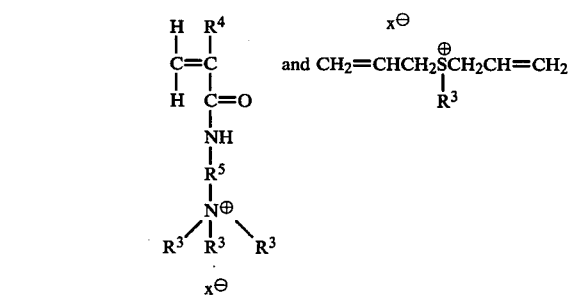

wherein
$R^3$ is a phenyl or an alkyl group of from 1 to 3 carbon atoms,
$R^4$ is a hydrogen or an alkyl group of from 1 to 3 carbon atoms,
$R^5$ is a straight or branched chain of from 1 to 12 carbon atoms, and
X is an anion.

13. The method of claim 8, wherein at least 0.125 pound of polyampholyte is used per barrel of aqueous clay dispersion.

14. The method of claim 8, wherein said polyampholyte has an intrinsic viscosity of 0.5 to 4.5 dl/g.

* * * * *